No. 765,473. PATENTED JULY 19, 1904.
J. R. GEORGE.
APPARATUS FOR HANDLING COILED BUNDLES OF RODS OR WIRE.
APPLICATION FILED FEB. 27, 1901.
NO MODEL.
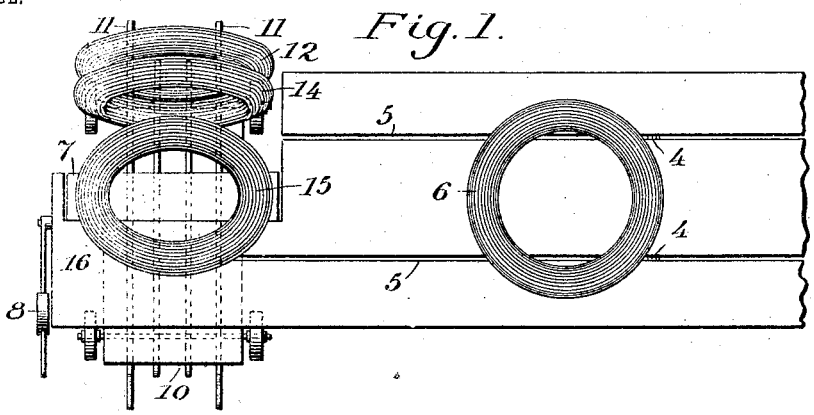
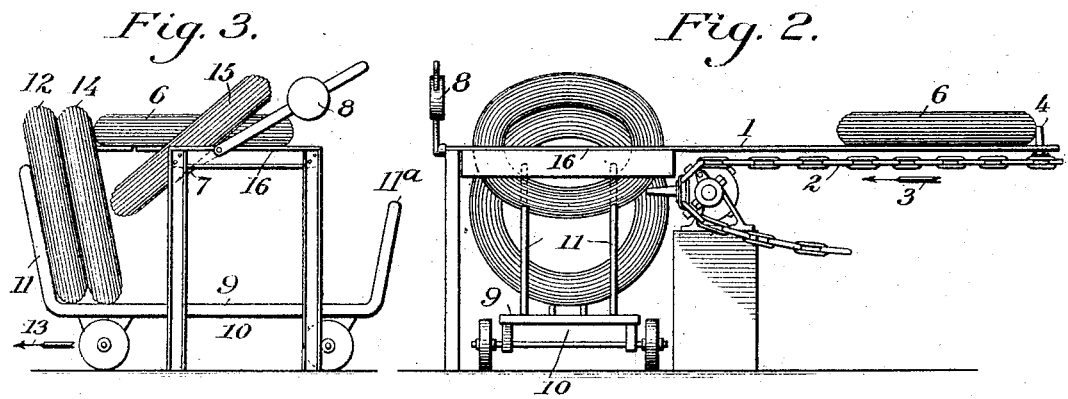
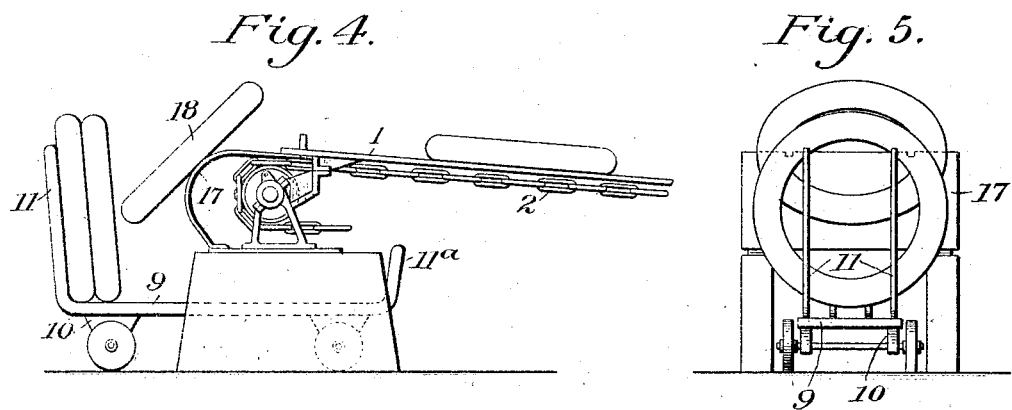
Witnesses:
Rufus B. Fowler
Penelope Comberbach.
Inventor:
Jerome R. George.

No. 765,473.

Patented July 19, 1904.

UNITED STATES PATENT OFFICE.

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

APPARATUS FOR HANDLING COILED BUNDLES OF RODS OR WIRE.

SPECIFICATION forming part of Letters Patent No. 765,473, dated July 19, 1904.

Application filed February 27, 1901. Serial No. 49,091. (No model.)

*To all whom it may concern:*

Be it known that I, JEROME R. GEORGE, a citizen of the United States, residing at Worcester, in the county of Worcester and Commonwealth of Massachusetts, have invented a new and useful Improvement in Apparatus for Handling Coiled Bundles of Rods or Wire, of which the following is a specification, accompanied by drawings forming a part of the same, in which—

Figure 1 represents a top view of an apparatus for handling coiled rods or wire and embodying my invention. Fig. 2 is a side view. Fig. 3 is an end view of the same, and Figs. 4 and 5 are end and side views of a modified form of construction.

Similar reference-figures refer to similar parts in the different views.

The object of my invention is to provide an apparatus for discharging and delivering coiled bundles of wire or rods directly upon the trucks or cars and in an upright position, with the bundle resting upon its edge, by which the wire or rods are prevented from displacement and the bundle is held in position to be conveniently lifted off the truck by means of the lifting bars or frames usually employed, thereby enabling the coiled bundles to go directly from the rod-mill to the cleaning-house without rehandling; and my invention consists in the combination of the following instrumentalities: a truck capable of supporting the coiled bundles standing on their edge, means at one end of the truck for supporting a coiled bundle standing on its edge in a position slightly inclined from a vertical plane, means for discharging the coiled bundles upon the truck from an elevated support or conveyer edge foremost, whereby the coiled bundle is carried upon the truck by gravity and caused to tip by its momentum through a vertical plane and lean against said support, as hereinafter described, and set forth in the annexed claims.

Referring to the drawings, Figs. 1, 2, and 3 represent one form in which my invention is embodied, comprising a tilting table by which the coiled bundle is tipped from a horizontal position and caused to slide by gravity upon the truck, and Figs. 4 and 5 represent an apparatus from which the tilting table is omitted, but embodying the essential feature of my invention.

In the accompanying drawings, 1 denotes a platform located above an endless-chain conveyer 2, which is moved by any suitable driving power in the direction of the arrow 3 and is provided with lugs 4, which project through the slots 5 in the platform to engage the coiled bundle of rods or wire 6, resting upon the platform. The bundle 6 as delivered from the winding-reel is placed upon the platform 1 and is pushed along by the lugs 4 to the end of the platform and upon the tilting table 7, which is held normally in a horizontal position by a counterweight 8. The tilting table 7 is hinged at one edge and is rocked by the weight of the bundle, causing the bundle to fall by gravity and slide off the inclined table and strike upon its edge upon the bottom 9 of truck 10. The truck 10 is provided at its end with stakes or other suitable supports 11, so that the momentum of the bundle when its lower edge has struck the bottom of the truck will cause it to tip over in a slightly-inclined position and lean against the stakes 11 in the inclined position of the bundle 12. The truck is then moved along in the direction of the arrow 13 the space of one bundle, and the second bundle 14 is delivered against the first bundle 12. The truck is again moved to receive another bundle 15 from the table 7. At the opposite end of the truck I provide supports 11ª, similar to the supports 11, in order to hold the lower edges of the bundles when the truck is filled from sliding off the rear end of the truck, and I make the supports 11ª lower than the supports 11 to enable them to be moved beneath the elevated bundle-supporting surface. The tilting table is hinged at the side of a horizontal support 16, upon which one edge of the bundle is pushed with the center of the bundle overlapping the tilting table. The tilting table and the horizontal support 16 of the table are raised to allow the truck to be placed beneath the table, and the bundles are delivered by the apparatus shown in Figs. 1, 2, and 3 in a line at right angles to the movement of the conveyer-chain 2; but it will be obvious that the table if instead of being hinged parallel with the movement of the conveyer-chain be hinged at right angles thereto and in position to receive the bundles thereon from the platform 1 the tilting of the table will deliver the bundles in the same line as the movement of the conveyer-chain, as shown in Figs. 4 and 5, in which I have shown a modification of my apparatus, in that the tilting table is dispensed with and a fixed elevated support, preferably having an inclined or curved surface 17, is provided therefor, so that as the bundle is pushed by the conveyer-chain 2 it will be carried over the inclined surface 17 far enough to cause it to fall by gravity and slide upon the truck with its edge foremost. The edge of the coiled bundle strikes the truck and the momentum of the bundle will tip its upper edge forward through a vertical plane and cause the bundle to lean against the support 11 at the end of the truck in the position of the bundle 12, Fig. 3. In Figs. 4 and 5 the bundle 18 is represented in the position at which gravity begins to act.

I do not wish to confine myself to the precise construction and arrangement of parts as shown in the different views represented, the essential feature of my invention consisting in providing a discharging-surface which is elevated in proper relation to a truck, so that the coiled bundle when delivered from the elevated discharging-surface will be carried by gravity edge foremost upon a truck and when the bundle strikes the truck be tipped by the momentum of the bundle against a support adapted to hold the bundle in a position slightly inclined from a vertical plane.

What I claim as my invention, and desire to secure by Letters Patent, is—

1. In an apparatus for handling coiled bundles of wire, the combination of a truck, an inclined coil-support at one end, an elevated platform from which the coils are discharged, with free space between the end of said platform and said inclined support to allow the coil to turn as it falls into an inclined position, substantially as described.

2. The combination with a platform provided with slots, an endless moving chain having lugs projecting through said slots, whereby the coiled bundles are moved along said platform, an inclined surface at the end of said platform from which the bundles are discharged by gravity upon a truck, a truck beneath said inclined surface, a bundle-support at one end of said truck adapted to support the bundles in a slightly-inclined position, and a stop at the opposite end of said truck for holding the lower edges of the bundles from slipping upon the truck, substantially as described.

3. The combination with a receptacle for coils of rod or wire having an upright support, of a platform, means for pushing the coils along said platform, a tilting table at the end of said platform, and means for normally holding said table in a horizontal position, substantially as described.

4. The combination of a platform, means for moving the coils along said platform, a tilting table hinged at one edge with the axis of its hinge parallel with the movement of the coil on said platform, means for holding said table normally in a horizontal position and a receptacle having an upright support beneath said table, substantially as described.

Dated this 25th day of February, 1901.

JEROME R. GEORGE.

Witnesses:
V. E. EDWARDS,
WILLARD A. WINN.